(12) United States Patent
Brincat et al.

(10) Patent No.: US 9,037,444 B2
(45) Date of Patent: *May 19, 2015

(54) ENERGY USAGE IN INJECTION MOLDING SIMULATIONS

(71) Applicant: Autodesk, Inc., San Rafael, CA (US)

(72) Inventors: Paul Brincat, Thornbury (AU); Ian Malcolm Pendlebury, Donvale (AU); Russell Speight, Rowville (AU); Matthew Philip Pooley, Ithica, NY (US)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,474

(22) Filed: Mar. 4, 2013

(65) Prior Publication Data
US 2013/0191089 A1 Jul. 25, 2013

Related U.S. Application Data

(63) Continuation of application No. 12/467,045, filed on May 15, 2009, now Pat. No. 8,392,160.

(51) Int. Cl.
*G06F 17/50* (2006.01)
(52) U.S. Cl.
CPC ........ *G06F 17/5009* (2013.01); *G06F 17/5018* (2013.01); *G06F 2217/41* (2013.01)
(58) Field of Classification Search
CPC .................................................. G06F 17/5009

USPC ............................................................ 703/6
See application file for complete search history.

(56) References Cited

U.S. PATENT DOCUMENTS

| 4,534,003 | A | 8/1985 | Manzione |
| 5,097,431 | A | 3/1992 | Harada et al. |
| 6,816,820 | B1 | 11/2004 | Friedl et al. |
| 7,010,474 | B1 | 3/2006 | Wang et al. |
| 7,024,342 | B1 | 4/2006 | Waite et al. |
| 7,465,416 | B2 | 12/2008 | Nagaoka et al. |
| 2004/0041303 | A1* | 3/2004 | Kim et al. ............. 264/320 |
| 2004/0047935 | A1 | 3/2004 | Moss et al. |

* cited by examiner

*Primary Examiner* — Dwin M Craig
(74) *Attorney, Agent, or Firm* — Fish & Richardson P.C.

(57) ABSTRACT

Methods, systems, and apparatus, including computer program products, for determining energy indicator values for a plurality of thermoplastic materials. An energy indicator value represents expected energy requirements for performing an injection of the material in a mold cavity. An injection of each of a plurality of thermoplastic materials in a first modeled mold cavity is simulated. A respective value of a first expected energy parameter is determined for each of the plurality of thermoplastic materials based on the simulated injections. A respective energy indicator is determined, for each of the plurality of thermoplastic materials, based at least on the corresponding value of the first expected energy parameter. The respective energy indicator value of one or more of the plurality of thermoplastic materials is presented.

18 Claims, 7 Drawing Sheets

SELECT MATERIAL

ENVIRONMENTAL IMPACT

405

◉ COMMONLY USED MATERIALS:

DELRIN 100 NC010: DUPONT ENGINEERING POLYMERS
POLYVIN 9074-GN-35: A SCHULMAN GMBH
PELLETHANE 2355-95AE: DOW CHEMICAL USA
SABIC PP CX04-81: SABIC EUROPE B.V., PP AUTOMOTIVE
GENERIC PP: GENERIC DEFAULT

410

415 REMOVE

425 CUSTOMIZE MATERIAL LIST... RESET MATERIAL LIST

○ SPECIFIC MATERIAL:

MANUFACTURER

430 A SCHULMAN GMBH ⌄ IMPORT...

TRADE NAME

POLYVIN 9074-GN-35 ⌄ SEARCH...

☑ ADD MATERIAL TO COMMONLY USED LIST AFTER SELECTING

420

DETAILS... REPORT... OK CANCEL HELP

FIG. 4

ENERGY USAGE IN INJECTION MOLDING SIMULATIONS

CROSS-REFERENCE TO RELATED APPLICATION

This application is a continuation application of, and claims priority to, U.S. Pat. No. 8,392,160, filed on May 15, 2009, entitled "Energy Usage in 5 Injection Molding Simulations". The disclosure of the foregoing application is incorporated herein by reference in its entirety.

BACKGROUND

The present disclosure relates to computer-implemented production simulations, including simulations of injection molding.

Injection molding is a common manufacturing method in modern industry. In a typical injection molding application, thermoplastic, thermosetting, or elastomer material is heated and melted and then piped or injected under pressure into the voids of an empty die or mold. The molten material injected into the mold is then cooled so as to permanently harden in the shape of the hollow mold cavity. The cooled and set material is then removed from the mold, forming the near finished product, piece, or part in the shape of the mold. Injection molding can be an efficient method of production in that it typically allows manufacturers to reuse one or more dies and reproduce, with precision, the products formed in the die. Typically, the initial design and manufacture of the mold is quite costly. Much is invested to design and perfect a mold that will be re-used, in some instances, millions of times over the course of its life. Consequently, injection molding is often characterized by high efficiencies of scale, the return on investment for a particular die dependent on the durability and lasting precision of the die. As a result, typical injection mold cavity design is at the same time a critically important, but difficult and costly process.

Thousands of polymer materials exist capable of being used in injection molding applications. In some instances, the material that is to be used in an injection molding application can even influence the design of a given mold cavity and visa versa. For instance, some high viscosity materials, in their molten form, may perform poorly in a mold cavity machined with narrow gates, runners, and cavity voids. As a consequence, mold cavity engineers must often determine in advance what materials will be planned for use with a given injection molding die.

SUMMARY

This specification describes a number of methods, systems, and programs that simulate injection of various polymer materials into modeled mold cavities to derive an energy indicator value for each polymer material representing the expected energy requirements for performing an injection of the material in a mold cavity. An expected energy parameter value can be determined for each material based on the simulated injection of the material in a mold cavity, the energy indicator of a material based at least in part on its respective energy parameter value. In some implementations, the energy indicator can be derived from the results of multiple simulated injections of a material. For instance, injection of a material can be simulated for multiple modeled mold cavities of varying geometries and dimensions, to simulate different flow conditions.

Particular embodiments of the subject matter described in this specification can be implemented to realize one or more of the following advantages, including increased energy efficiency in injection molding applications. Energy efficiency of a material can result, over the long term, in cost savings and increased profits, as injection molding manufacturers reduce energy costs through the use of more energy-friendly materials. Additionally, identifying materials with easier processing capabilities can also help to design and build molds more resistant to wear and tear, reducing the likelihood that a replacement mold will be needed.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a screenshot of an example graphical user interface menu for selecting a material for use in an injection molding simulation.

Like reference numbers and designations in the various drawings indicate like elements.

DETAILED DESCRIPTION

An injection molding simulator can model and predict the performance and dynamics of a hypothetical injection molding equipment as it injects a particular thermoplastic material into a particular mold cavity. The shape of the mold cavity as well as the polymer material used in the simulation can result in a particular, predicted result. Repeating the simulation with either a different thermoplastic material or mold cavity having different dimensions may result in a different predicted result. In deriving a predicted result, the injection molding simulator may consider the physical, mechanical, and rheological characteristics of the real world thermoplastic material. These material characteristics can influence how the material would be injected into a given mold cavity in a real world mold injection. For instance, some thermoplastic material may require higher or more prolonged injection pressure than other materials to inject the material through the runners and gates into the mold cavity of a particular die. Additionally, some materials may require longer or more demanding cooling processes in order to properly and efficiently set the material. Consequently, these and other considerations can influence the amount of energy that will be required to inject a material into a given mold cavity. This can influence the selection of one material over another in a given project. To assist in this selection, results derived from sample injection simulations involving various materials can be used to calculate a comparative energy usage indicator that an engineer can consider when making design choices for use in a real-world injection molding project.

Figure 1A:
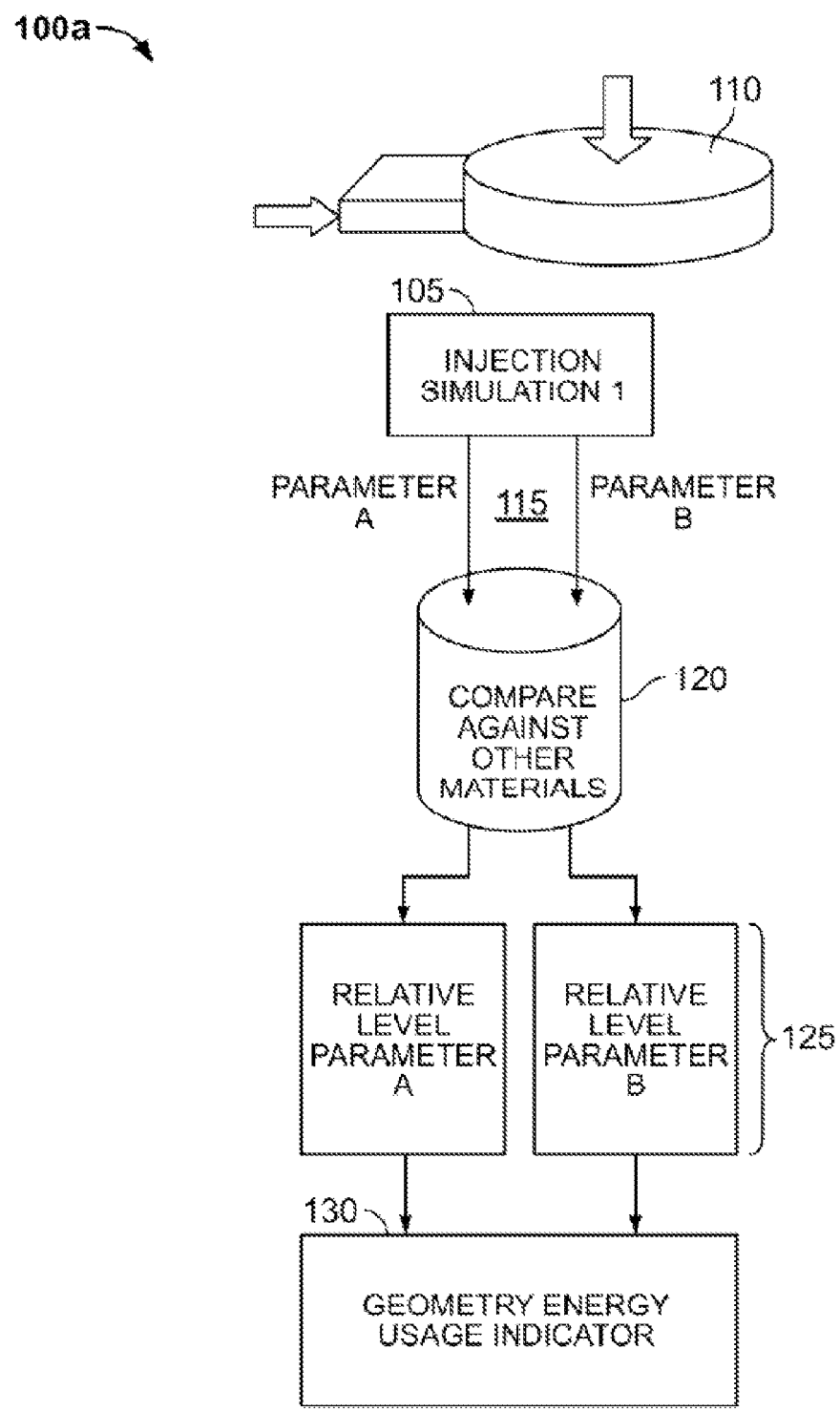
FIG. 1A is a flow-diagram of an example technique for generating an energy indicator value from a simulated injection of a thermoplastic material.

FIG. 1A illustrates an example technique 100a for calculating an energy indicator value based on one or more injection molding simulations. In the particular example illustrated, an injection simulation application simulates 105 the injection of a particular material. The simulation can be based on the physical, mechanical, or rheological characteristics, or combinations of these, of the particular material. The simulation 105 can be carried out using or based on interactive computer aided design software such as Moldflow and Moldflow Insight, available from Autodesk, Inc. of San Rafael, Calif., or the simulation can be run in a non-graphical simulation applying formulas, statistical models, and algorithms adapted to compute or predict select aspects of the injection of a material in a particular mold cavity. Injection molding can be simulated, for example, by selecting a computer-modeled, three-dimensional mold cavity (e.g., 110) having a particular geometry and dimensions. The simulation 105 can model the pressurized injection of the material, based on the material's properties, into the modeled mold cavity, including modeled gates and runners leading into the primary mold cavity. Various methods of injection molding can be simulated including, for example, sandwich molding, overmolding, fusible core injection molding, gas-assisting injection molding, and other injection molding processes.

In addition to simulating the step of injecting the material into the modeled mold cavity, a simulation 105 can also model the cooling and setting of the material within the modeled mold cavity. For example, a simulation 105 can determine the amount of time required for a particular material to set in a cavity of a certain geometry. In some instances, cooling of the filled mold cavity can be simulated for systems employing chillers and other cooling devices used to hasten the setting process. The simulation 105 can determine, for example, the amount of time required for a given material to set once it has been injected into a cavity with a particular geometry. For instance, the simulation 105 can be a prediction or determination based on certain chemical and mechanical qualities of the material.

In some instances the simulation 105 involves the simulated injection of materials in a single mold cavity, with a first set of dimensions. The mold cavity can be a standardized or generic cavity, used as a baseline for comparing performance of one material over another, or cavities possessing geometries that can assist in determining materials' flow performance in thin, wide, lateral, axial, and other particular flow applications. In other examples, the mold cavity can be a user-customized mold cavity. One or more dimensions of a modeled cavity can be customized and set by the user. Injection of a material within the custom cavity can then be simulated. In some instances, computer-modeled mold cavities with complex geometries can be built and simulated. For instance, a user can design a mold cavity model for use in a simulator using three-dimensional industrial drafting software.

In some implementations, computer-based simulations of the injection of a thermoplastic material in a mold cavity can utilize computational fluid dynamics models and tools, capable of predicting the force needed to inject a material in a cavity. Some simulations can provide more detailed analysis modeling the interactions of fluids flowing on, over, and across surfaces of mold cavities. Simulations may only approximate the performance of fluids within a mold cavity. Injection molding simulations can be based on Navier-Stokes equations, Euler equations, full potential equations, or linearized potential equations, for example. For instance, the viscosity of a liquid, thermoplastic material can be modeled based on the a cross fluid model:

$$\mu_{\mathit{eff}}(\dot\gamma) = \frac{\mu_0}{1 + \left(\frac{\mu_0 \dot\gamma}{\tau^*}\right)^{1-n}}$$

where $\mu_{\mathit{eff}}(\dot\gamma)$ is the material's viscosity as a function of shear rate and $\mu_e$, $\tau^*$, and n are simulation-specific coefficients. Simulations of a material's cooling and setting within the mold cavity can also be modeled using computer-based simulations. For example, heat transfer equations and models can be employed to model a given material's cooling and hardening. A material formed into a particular geometry and in contact with a particular die material can be modeled, for example, by using the following equation:

$$\frac{dQ}{dt} = h \cdot A(T_0 - T_{env})$$

where Q is the thermal energy of the material, h the heat transfer coefficient of the material, A the surface area of the material when formed into the particular geometry of the cavity, $T_0$ the temperature of the object's surface, and $T_{env}$ the temperature of the environment, including the temperature of the die. In other examples, additional or substitute models, algorithms, and formulas can be used, for example, to determine minimum or optimum conditions for injection or cooling of a material in a mold cavity, or calculate or predict energy-related values or ranges of values.

Data can be generated as a result of a simulated injection of a material in a given modeled mold cavity, the data reflecting aspects of the material's performance during simulation. For example, the amount of pressure, the duration of the modeled injection, or a determined preferred pressure for injecting the material in the mold cavity can be returned. As mentioned above, data relating to the rate and duration of a material's cooling and setting in a given mold cavity can also be determined, including data related to the type and duration of cooling techniques employed to set the material in the mold. This data can relate to the energy required to either inject and/or set the material in the mold. One or more energy-related data parameters generated in the simulation can then be passed 115 from the simulator for use in comparing 120 the performance of one material against another in a particular simulated injection.

A set of materials can be stored in a database or in other persistent storage, including data representing the physical characteristics of each material. The set of materials can be those materials available for use in modeling an injection simulation using a particular injection molding simulator. For example, an injection molding simulator used in designing and forecasting a real-world injection molding project can access or come equipped with the database storing the set of materials. The comparison 120 of materials' performance in a given modeled mold cavity can include a comparison involving every material in the database or a subset of materials in the database. For example, a designer may know that a real-world injection molding project requires one of a certain family of thermoplastic materials. Accordingly, the comparison can be limited to a relevant family or subset of available materials.

Comparing the performance of one material against another may require that injection of each material in the comparison be simulated 105 for a given mold cavity 110. In some implementations, the simulations involving each material are standardized. For example, injection of each material can be simulated using the same modeled injection technique. By way of illustration, the same injection pressure can be used in each simulation. In that environmental factors can also affect the real-world injection of a material in a die cavity, the environmental factors, such as ambient temperature and humidity, can be standardized. Cooling conditions of the simulations can also be standardized. In other examples, the simulation can involve an optimization step, where the simulation conditions of each simulation are tailored to the particular material. For instance, it may be determined that certain thermoplastic materials require a higher injection pressure than others. Indeed, in order to simulate successful injections across the set of materials, it may be necessary to optimize injection and/or cooling conditions, because some materials may not be capable of being properly injected or set using a standardized technique. For example, the simulation 105 can determine a minimum required pressure for successfully injecting each material into the cavity 110 or a necessary cooling technique for setting each material. Successful injection can include a minimally acceptable time for completing injection and setting of the material. For instance, a simulation can be based on a given project requiring a certain minimum rate of manufacture. The minimum injection and cooling settings for reaching the project goals using a particular material can be considered the optimized values determined by the simulation 110. Optimization can also involve determining an ideal or most efficient set of injection or cooling settings for each material given the dimensions of the modeled mold cavity. Optimized conditions calculated for each material can then be used as parameters in the comparison.

Comparison of materials' simulated injection in a given modeled mold cavity can result in the generation of relative performance parameters 125. Relative performance parameters can be based on the parameters returned 115 from the simulation. When a simulation 105 returns multiple parameters 115, these parameters can be synthesized into a single relative performance parameter 125 or multiple performance parameters (such as shown in FIG. 1A). Indeed, in some instances, a relative performance parameter 125 can be generated for each parameter returned 115 by the simulation 105. The relative performance parameter expresses the relative energy requirements of using one material in the database over another. For instance, the performance parameter may be a ranking of the materials in the comparison based on one or more of the returned simulation parameters 115. In other examples, the performance parameters 125 can be scores (e.g., 1-10) or categorizations. For instance, a subset of materials with simulation parameters 115 exhibiting the lowest energy usage among the compared set, can be awarded a score of 1 on a 1-10 scale, the materials exhibiting the highest energy usage receiving a score of 10. Alternately, the compared materials can be broken into groups, on the basis of one or more simulation parameters 115. For instance, materials can be grouped as "Energy efficient," "Energy neutral," or "Energy intensive." Relative performance parameters 125 can be normalized values, scores standardized on a curve for the compared materials, or based on another technique. In other implementations, an absolute performance parameter can be generated in lieu of, or in addition to, a relative performance parameter 125. An absolute performance parameter can be generated that is independent of other materials' energy performance, allowing absolute performance parameters to be generated without a comparison step 120, for example, by basing energy indicator values on a fixed, non-relative scale.

In various implementations, the relative performance parameter 125 reflects a material's energy usage relative to the other materials in the comparison 120. The relative performance parameter is then used to generate an energy usage indicator 130. Where more than one relative performance parameter is returned 125 from the comparison, generation of a mold-cavity-specific energy indicator value 130 can involve synthesizing the relative performance parameters to generate the single energy indicator value 130. For instance, generation of energy indicator value 130 can be based on an average or weighted average of the multiple relative performance parameters 125. Where relative performance parameters have distinct units of measurement (e.g., one parameter is a ranking, the other a weighted score), generation of the energy indicator value 130 can involve converting and/or standardizing one or more of the relative performance parameters 125. Synthesizing a set of relative performance parameters can result in a cumulative or averaged score or value. This cumulative score or value can then be translated into a more generally, user-friendly value, such as an integer score (e.g., 1-10) or a ranking of materials. The translated score can reflect the cumulative performance of the material relative the other materials in comparison 120, this translated score taking into account the relative performance of each material on the basis of all simulation parameters returned 115 from the simulation 110.

Figure 1B:
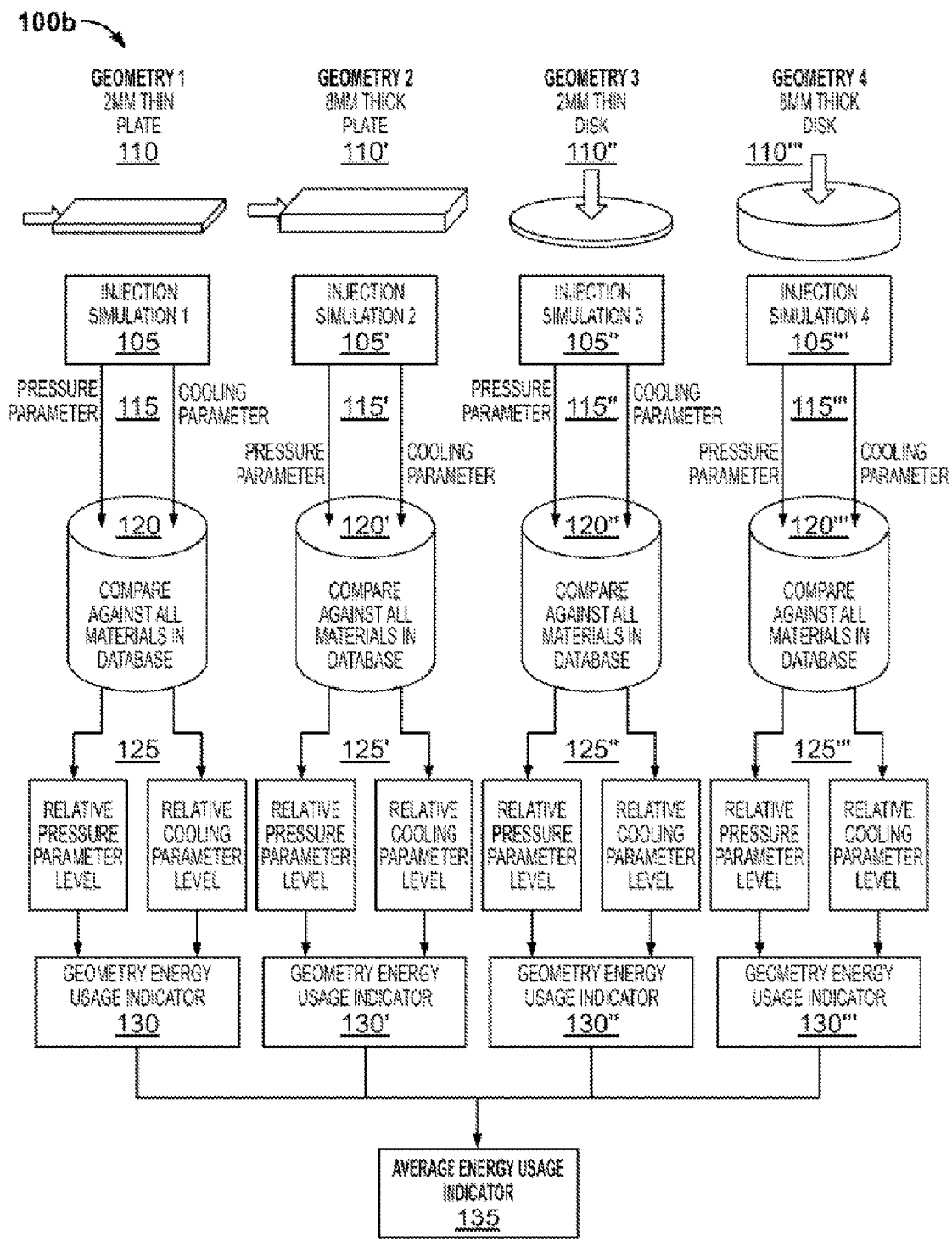
FIG. 1B is a flow-diagram of an example technique for generating a cumulative energy indicator value from a plurality of simulated injections of a thermoplastic material.

FIG. 1B illustrates an example technique for combining results of simulations involving multiple modeled mold cavities 110, 110', 110", 110''' to derive a cumulative energy usage indicator value 135 for each material in a set. Simulation-specific energy usage indicator values can be generated 130, 130', 130", 130''' for each material in a comparison 120, 120', 120", 120''' for each simulation 105, 105', 105", 105''' using techniques similar to that described in connection with FIG. 1A. Each simulation 105, 105', 105", 105''' can model an injection molding in a unique mold cavity. For example, mold cavities 110, 110', 110", 110''' can be modeled to represent real world mold cavities of varying geometries, dimensions, gating and running orientations, and die materials. The cumulative energy usage indicator value of a material can be generated 135, for example, by averaging, calculating a weighted average, or otherwise synthesizing the simulation-specific energy usage indicator values generated 130, 130', 130", 130''' for the material. The cumulative energy usage indicator value 135 can represent the cumulative or average energy usage characteristics of a particular material relative other materials.

In the example of FIG. 1B, four simulations 105, 105', 105", 105''', involving four modeled mold cavities 110, 110', 110", 110''', are used to generate a cumulative energy usage indicator for a set of materials. In this particular example, the geometries and dimensions of the mold cavities are selected to simulate injections involving linear material flow in side-gated injection molding applications and radial flow in center-gated applications, as well as flow in cavities of varying thicknesses. For instance, a first cavity 110 can be a thin, side-gated plate for simulating linear material flow. The second cavity 110' is a plate similar to the first cavity 110, albeit with a markedly thicker depth, allowing for simulation of linear material flow in thicker cavities. The third and fourth cavities 110", 110'" are center-gated disks for simulating radial flow in thin and thick injection molding applications respectively. A "thin" cavity dimension can be selected to model the narrowest range of cavity dimensions that are likely to be encountered within injection molding applications generally, or within a particular set of injection molding applications, for example, the projects and applications of a particular manufacturer or industry. Likewise, "thick" dimensions can be defined by the widest dimensions likely to be encountered within a given set of injection molding applications.

The simulation step 105, 105', 105", 105'" involves simulating injection and setting of every material in each set of materials in the corresponding modeled mold cavities 110, 110', 110", 110'". In this particular example, each simulation 105, 105', 105", 105'" returns two parameters 115, 115', 115", 115'", namely a first parameter relating to injection pressure needed to inject each material into the respective mold cavity, and second a parameter relating to the amount of cooling time required to set the material in the mold cavity. For each geometry, the returned first parameters of each material are compared against the returned first parameter of every other material. A like comparison is completed for the second, cooling time parameter. Based on the comparisons 120, 120', 120", 120'", a relative level value is assigned to each material's injection pressure and cooling time parameter for the injected simulation into the respective modeled mold cavity. In this case, each returned parameter is assigned a value of "1" for low pressure injection pressure, "2" for medium pressure injection pressure, and "3" for high pressure injection pressure. An injection pressure value is "low," "medium," or "high" relative the other injection pressure parameter values returned for other materials and reflects the relative energy usage for this step of the injection molding process involving a given material. Similarly, the cooling time parameter, in this example, is also assigned a relative value of 1, 2, or 3, relating to the relative energy requirements for cooling a given material injected into the modeled mold cavity.

Upon using the comparison 120, 120', 120", 120'" to generate relative parameter values 115, 115', 115", 115'", the relative parameter values can be processed to derive a simulation-specific energy usage indicator for each material 130, 130', 130", 130'". In this case, four geometry-specific energy indicator values will be derived. The energy usage indicator, in this case is numerical score between the range of 1 and 5. To determine the energy usage indicator 130, 130', 130", 130'", in this example, the injection pressure parameter is added to the cooling time parameter. The sum of the pressure and cooling parameters is then subtracted by 1. The four energy usage indicator 130, 130', 130", 130'" for each material are then averaged, in this example, to generate a cumulative energy indicator value 135 for the material.

Figure 2:
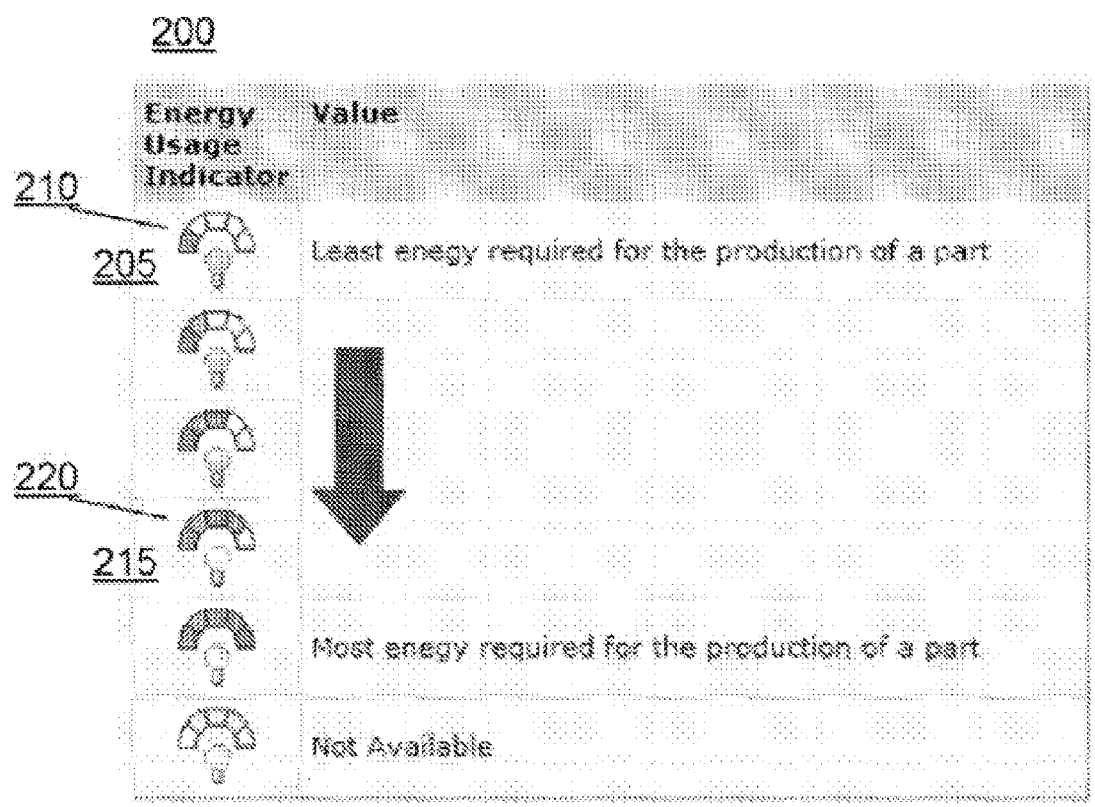
FIG. 2 is an illustration of an example graphical representation of an example range of potential energy indicator values attributable to a thermoplastic material

A cumulative energy indicator 135 can be useful in that it provides a single value that a user can quickly assess to understand some of the energy usage advantages to selecting one material over another. In some instances, an energy usage indicator can be expressed as a graphic or icon, simplifying the representation of a material's usage indicator value, such as shown in FIG. 2. In the example energy usage indicators 200 of FIG. 2, the value of the energy usage indicator is designated on a five-point scale, indicated by a dial. For instance, for a material with an energy usage indicator value of "1," an energy indicator icon 205 can be displayed with a dial 210 having one block highlighted. This indicator 205 can represent the relative energy usage for a material that requires a relatively low amount of energy for injection into a given mold cavity. An energy indicator icon 215, with a dial 220 having four blocks highlighted, can represent an energy usage value of "4" showing relatively high energy usage requirements connected to a material. In this particular example, the dial 210, 220, is used to present the value of the energy usage indicator quickly and understandably to the user, while in other implementations other, comparable conventions can be used.

Modern industrial mold cavities can be quite complex, incorporating multiple gates, linear, radial, and vertical flow paths, and cavities of various geometries and dimensions within a single die. Additionally, during the mold cavity design process, modifications can often be made, changing the profile and flow patterns of the cavity. Consequently, cumulative energy indicators 135 capable of reflecting a material's performance in a variety of circumstances can prove quite useful to a injection mold designer. Such cumulative energy indicators 135 can be developed, for instance, by deriving the energy indicator 135 from multiple, diverse injection molding simulations that model various geometries, gatings, thicknesses, and environmental factors.

Figure 3:
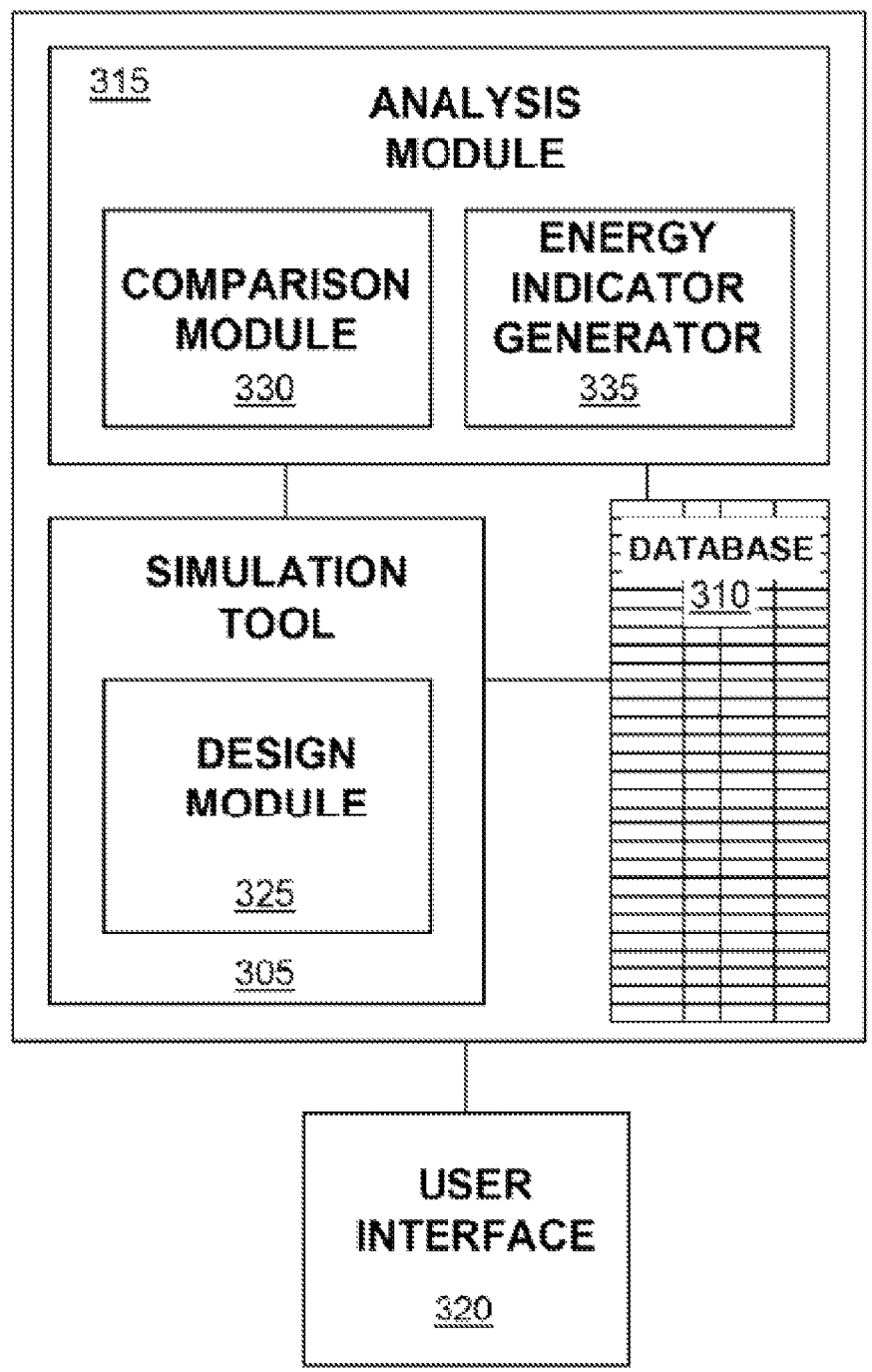
FIG. 3 illustrates a schematic diagram of an example system for generating an energy indicator value for use with an injection molding simulator.

FIG. 3 is a schematic diagram of an example injection molding simulation system 300 capable of performing one or more of the steps and techniques described above in connection with FIGS. 1A and 1B. The system 300 can include injection molding simulation software module 305, a materials database 310, an analysis software module 315, and a graphical user interface 320. The simulation module 305 can simulate injection of thermoplastic materials into a modeled mold cavity and return expected injection performance data based on the injection simulations. In some instances, the simulation module can include a design module 325, providing the simulator 305 with drafting functionality allowing users to construct custom, three-dimensional mold cavity model as well as custom injection molding simulations. For example, a user can create a simulation modeling an injection of a user-specified material into a user-created mold cavity model using the design module 325 in simulator 305.

The material database 310 can contain data for use by the simulation module 305, allowing the simulation module 305 to simulate injections of modeled thermoplastic materials found in the real-world. Currently, thousands of thermoplastic and thermoset materials exist, capable of being used in real world injection molding applications. The material database 310 can store data including the identification and characteristics of potentially thousands of these materials. The database 310 can store data representing those material characteristics which allow the simulator module to generate predictions relating to the energy that would be used to perform certain injection molding steps involving the material. Such material characteristics can include the material's glass transition temperature, melting temperature, viscosity, and viscoelasticity, as well as the material's rheological, thermal, mechanical, shrinkage, optical, and environmental properties.

The material database 310 can also store and associate additional values and characteristics for use by the analysis software module 315. The analysis module 315 can include a comparison module 330 and an energy indicator generator 335. The analysis software module 315 can be adapted to perform comparisons of materials in the material database 310 based on parameters, predictions, and results returned by the simulation module 305. Based on these comparisons, the analysis module 315 can derive comparative values or scores that can then be used by the analysis module to generate an energy usage indicator value. Additionally, in some instances, the analysis module 315 can consider additional values stored in the material database 310, related to energy usage but not used by the simulator module 305. For instance, the energy required to manufacture, dispose, or recycle a material can vary. Additionally, some materials used in injection molded products have longer life spans than others, resulting in an effective energy increase for products made of materials that need replacing more frequently than products of more durable thermoplastic materials. The analysis module can compare raw energy usage and environmental impact data relating to the lifecycles of a set of materials and derive corresponding relative performance parameters. Relative performance parameters based on material lifecycle data can be combined with relative performance parameters based on simulation result data to generate energy usage indicators. Additionally, the analysis module 315 can generate cumulative energy usage indicators based on sets of generated energy usage indicators derived from material lifecycle data as simulation result data.

Comparative energy usage indicators generated using the simulation module 305 and analysis module 315 can be stored and associated with corresponding material data in the material database 310. Additionally, energy indicator values can then be used in connection with users' custom simulations involving the simulation module 305, including design module 325. For instance, when designing a custom injection molding simulation, a user may select one or more materials to be used in the simulation. The user may select materials represented in data of the material database 310. A drop-down menu, or other menu may be presented to the user on a graphical user interface 320 of the simulation system 300. the menu may present a listing of the materials stored in the database 310, or some subset of materials. For example, a user can sort and filter materials in the database 310 that are available for use in a custom simulation. An energy usage indicator value, graphic, or icon, representing the relative energy efficiency of each material, can then be displayed for each material in the menu or listing.

In some implementations, as illustrated in the example screenshot 400 of FIG. 4, an energy indicator value icon 405 can be displayed in conjunction with an available material in a material selection menu 410. In this example, highlighting a particular material 415 results in the presentation of the energy indicator value 405 of the highlighted material 415. With such a menu 400, a user can scroll through contemplated materials to immediately assess the relative energy usage of each material. A user can then select one or more materials for use in a custom simulation, for example, by selecting the "OK" button 420. A user can also customize 425 a listing of materials from the materials database available for selection. For instance, the user may select, search, sort, or filter the available materials to generate a listing of a subset of materials in the database. A search, sort, or filter can, for example, be based on the energy indicator values of the materials. For instance, a user may wish to filter a result set for those materials having an energy indicator value below a certain level. In other examples, a user can sort a subset of materials according to energy indicator value. For example, a user, desiring to simulate a real world project, may wish to sort a listing of materials manufactured by a certain manufacturer. The user can enter or select the manufacturer 430 and generate a listing of those materials in the database manufactured by the selected manufacturer 430. The user can then further filter or sort this listing, for example, rank-listing the subset of materials from "A. Schulman GMBH" by the energy indicator value derived by the simulation system 300.

Figure 5:
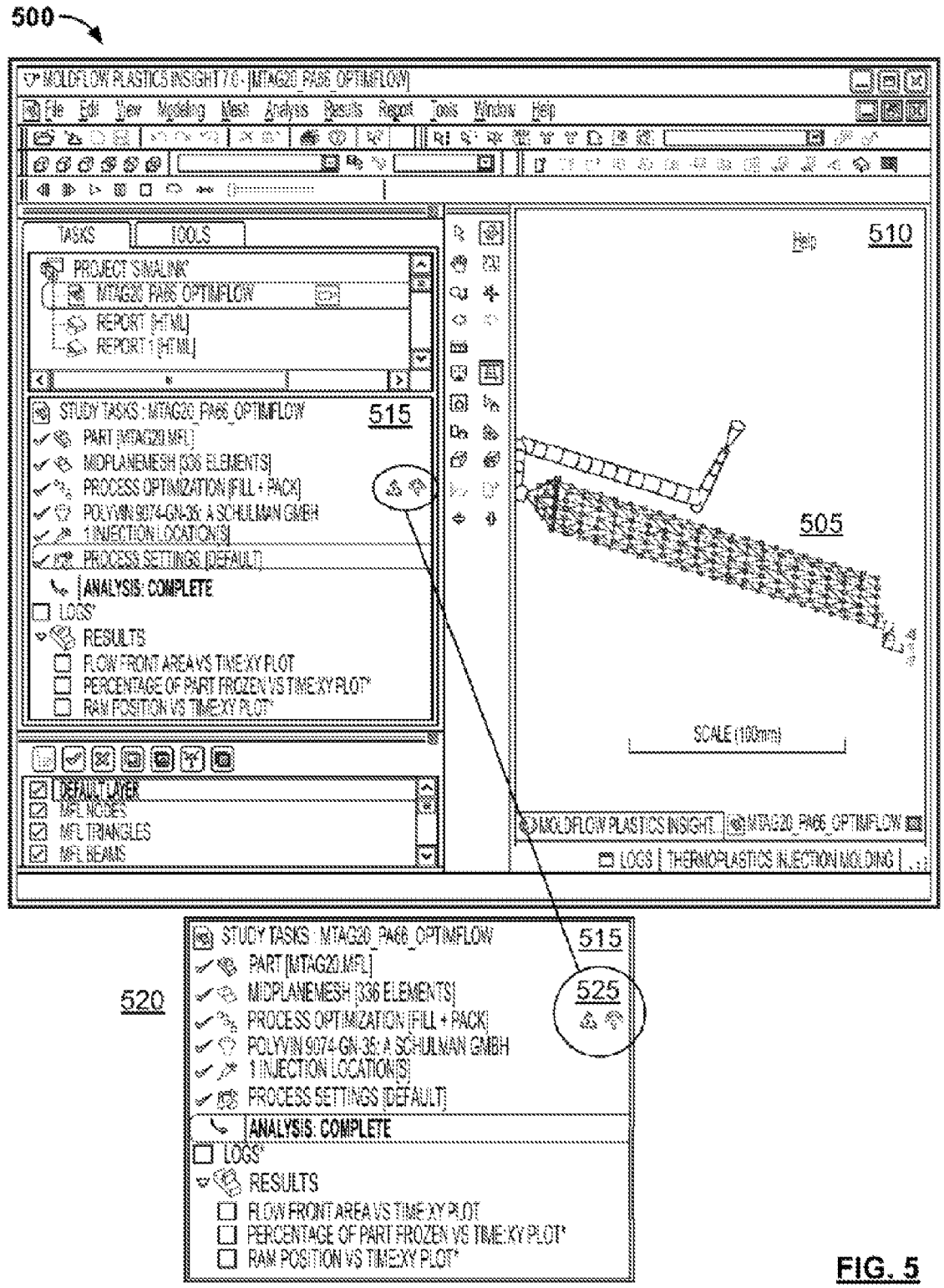
FIG. 5 is a screenshot of an example injection molding simulator graphical user interface presenting an energy indicator value.

FIG. 5 is a screenshot of an example user interface 500 of a injection molding simulation tool. Using the software-based simulation tool, a user can visualize the three-dimensional form 505 of a mold cavity in user interface window 510. The user can further simulate and visualize the injection and curing of thermoplastic material injected in the modeled mold cavity. A second window 515, shown in break-out view 520, can present simulation status information to the user. For instance, during simulation, status window 515 can present the name of the material being injected in the simulated mold cavity together with an energy indicator value 525 derived using the same simulation tool. The user interface 500 can further provide tools for drafting and editing the modeled mold cavity 505, allowing the user to design and fine tune a mold cavity model in advance of producing its real world equivalent.

In some instances, a relative energy usage indicator can be generated using techniques similar to those described in connection with FIGS. 1A and 1B, based on a complex, user-created modeled mold cavity. In some instances, the complexity of a user-created modeled mold cavity can tax the processing capabilities of a simulation tool adapted to simulate certain aspects of the injection and curing of a thermoplastic material in a modeled mold cavity. In such instances, it may be desirable to limit the set of materials that will be simulated and compared for energy usage, based on simulations using the complex, user-created mold cavity. This can be especially true where the total number of available materials for simulation exceed the hundreds or thousands.

Figure 6:
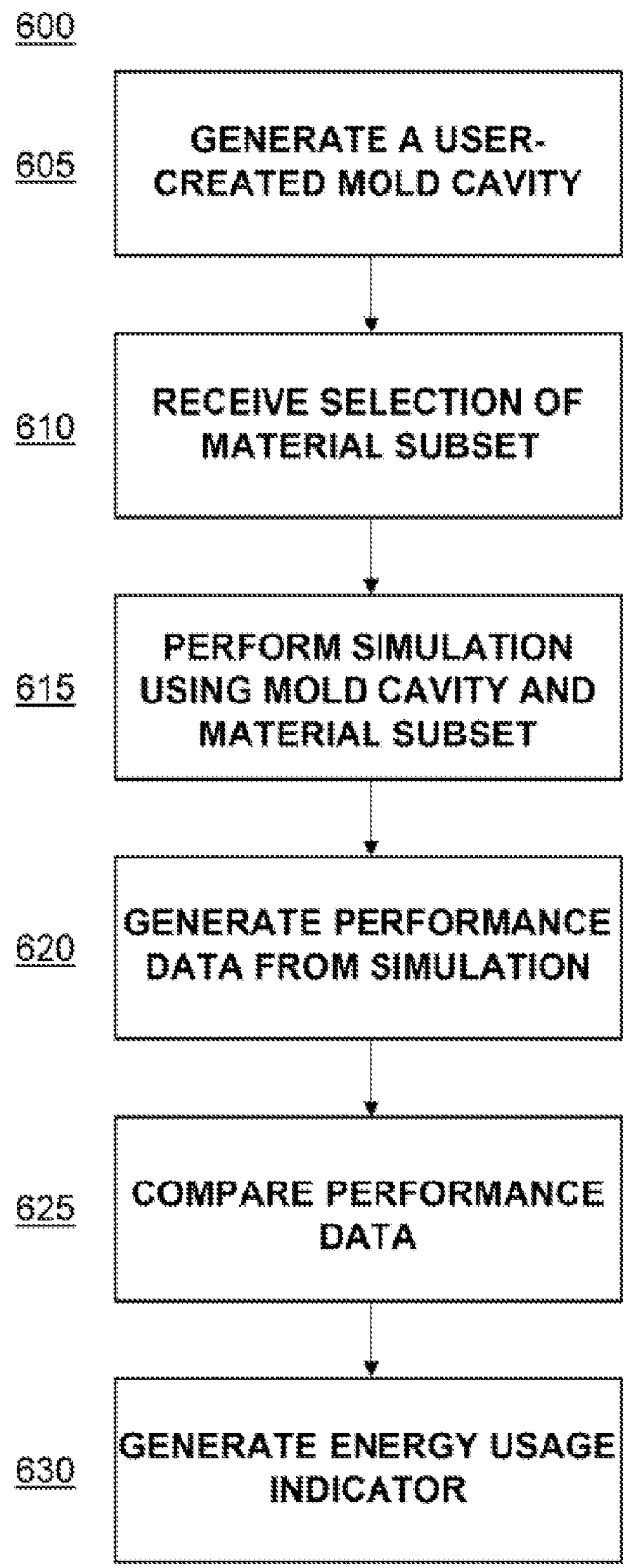
FIG. 6 is a flow-diagram of an example technique for using an energy indicator value in connection with an injection molding simulator.

As shown in the flowchart 600 of FIG. 6, in some instances, a user may design a custom mold cavity 605, having user-defined geometry and dimensions. In some instances the user-generated mold cavity model can have a complex geometry and specify additional mold cavity characteristics such as the mold's material. The user can then select a subset of materials 610 from a database having material characteristic data capable of being used in an injection molding simulation. The subset of materials can be a small subset of potential materials the user is contemplating employing in a real world application, or may include all materials in the material database used by the simulator. Using the material characteristic data from the user-specified subset, the injection mold simulator can then simulate the injection and/or curing of each of the materials in the subset 615. The simulation can generate material-specific performance data 620 based on the simulations 615. Using the material-specific performance data 620, a comparison of the predicted energy used in each simulation for each material can be derived 625. The comparison may be carried out by first deriving relative performance values for each material, such as described in the techniques illustrated in FIGS. 1A and 1B. Using this comparison 625, the simulator can then generate energy usage indicator values 630 for each of the materials involved in the simulation 615. The energy usage indicator values can be a score, a ranking, or some other value. The energy usage indicator can then be displayed 630 to the user.

As an example of the technique described in FIG. 6, a user can select a subset of six materials the user has determined to be the most likely candidates for a given real-world application involving a user-designed mold cavity. To assist the user in determining which of the six materials to ultimately use, the user can instruct the injection molding simulator to conduct a comparative energy usage analysis for the set of six materials. The software-based injection molding simulator can then perform an injection molding simulation for each material using the user-designed mold cavity. The simulator upon performing each of the six simulations can then collect various data parameters resulting from the simulations and perform a comparative analysis of the parameters. For instance, each simulation may result in a predicted injection pressure rating to be used for each material and the minimum required cooling time for curing each material in the custom mold cavity. The returned parameters can be compared for each material, according to techniques described in connection with FIGS. 1A and 1B, and derive an energy usage indicator value for each of the six materials.

Conducting a precise injection molding simulation for a complex, user-designed mold cavity model can, in some instances, be particularly processor-intensive. In some examples, simulation of a custom mold cavity model can be approximated using simpler geometries, or combinations of geometries. For instance, the simulator can automatically identify, in a user-designed mold model, elements in or sections of the mold model that can be approximated with modeled mold sections or pieces having simple geometries such as cylinders, disks, spheres, and prisms. For example, a substantially tubular or rod-like section of a user-designed mold model can by identified as approximating a cylindrically-shaped element. Accordingly, the simulator can automatically substitute, or suggest substitution of, the user-designed non-uniform or complex tubular section with a simple cylindrical section having related dimensions. Simplifying a user-designed mold model in this manner can, among other advantages, allow simulations to then be performed more quickly and with less processing bandwidth. Additionally, computing resources spared using such approximated geometrical models can allow for simulations and comparisons involving greater numbers of materials.

The energy usage indicator value, generated in the example of FIG. 6, can reflect the overall energy usage performance of each material relative the other five materials, based on the particular data parameters returned by the simulations. It is also important to note, that the energy usage indicator value derived in this example is specific to the particular, user-created mold cavity used in the simulation. Other simulations involving the same group of six materials but different mold cavities possessing distinct geometries, may result in entirely different energy indicator values being derived. Additionally, in that each energy usage indicator value is a relative measure, the addition of other materials to the original set can result in different energy indicator values for the original six in the subset of this particular example.

In addition to performing energy usage analyses for a set of materials injected in a user-defined mold cavity, users can further customize injection molding simulations employing the simulator tool. For instance, a user can specify what energy-related result parameters, derived during an injection molding simulation, to be used in ultimately deriving the energy usage indicator values for the materials in the simulation. For instance, a user may be more concerned with the energy usage during the injection phase of an injection molding project and elect for the simulator tool to ignore data relating to the cooling and setting of the injected material modeled in the simulation. The user can also modify the conditions of a simulation. For instance, the user can specify injection pressure and/or cooling settings used by the simulator tool to customize the simulation to the specific, real world tooling available to the user. Environmental and other settings can also be specified by the user, for example, the ambient temperature during injection.

Various implementations of the systems and techniques described in this specification can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the subject matter have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method comprising:
    simulating injection of each of a plurality of thermoplastic materials in each of a plurality of modeled mold cavities, each of the modeled mold cavities having different geometric dimensions;

determining respective values of a first expected energy parameter for each of the plurality of thermoplastic materials, the respective values of the first expected energy parameter for each of the plurality of thermoplastic materials being based on the simulated injection of the thermoplastic material in the plurality of modeled mold cavities;

determining respective values of one or more additional expected energy parameters for each of the plurality of thermoplastic materials, each value of an additional expected energy parameter for each of the plurality of thermoplastic materials being based on the simulated injection of the thermoplastic material in the plurality of modeled mold cavities;

determining, for each of the plurality of thermoplastic materials, a respective energy indicator value based at least on the respective values of the first expected energy parameter for the thermoplastic material and the respective values of the additional expected energy parameters for the thermoplastic material, the energy indicator value representing expected energy requirements for performing an injection of the thermoplastic material in a mold cavity; and presenting the respective energy indicator value of one or more of the plurality of thermoplastic materials.

2. The method of claim 1, wherein each of the dimensions of the modeled mold cavities are adapted to simulate a distinct flow condition of thermoplastic material.

3. The method of claim 2, wherein:
the plurality of modeled mold cavities comprises a first cylindrical disk cavity having top and bottom circular end surfaces and a central injection gate located at the top circular end surface,
the plurality of modeled mold cavities further comprises a first rectangular plate cavity having four lateral end surfaces and a lateral gate located at one of the four lateral end surfaces,
the simulated injection of thermoplastic material into the first cylindrical disk cavity simulates injection of each of the plurality of thermoplastic materials into the first mold cavity through the central injection gate, and
the simulated injection of thermoplastic material into the first rectangular plate cavity simulates injection of each of the plurality of thermoplastic materials into the first rectangular plate cavity through the lateral injection gate.

4. The method of claim 3, wherein the plurality of modeled mold cavities further comprises:
a second cylindrical disk cavity having top and bottom circular end surfaces and a central injection gate located at the top circular end surface;
a second rectangular plate cavity having four lateral end surfaces and a lateral gate located at one of the four lateral end surfaces; and
wherein a volume of the first cylindrical disk cavity is greater than a volume of the second cylindrical disk cavity and a volume of the first rectangular plate cavity is greater than a volume of the second rectangular plate cavity.

5. The method of claim 1, wherein the first expected energy parameter is related to the cooling time of a thermoplastic material and one or more of the additional expected energy parameters are related to the injection pressure to be applied to a thermoplastic material.

6. The method of claim 1, wherein the energy indicator value is based at least in part on a comparison of the value of the first expected energy parameter for the thermoplastic material with the values of the first expected energy parameter for one or more other thermoplastic materials in the plurality.

7. The method of claim 1, wherein determination of the energy indicator value for each of the plurality of thermoplastic materials is also based on one or more of a lifecycle characteristic of the thermoplastic material and an environmental impact characteristic of the thermoplastic material.

8. The method of claim 1, wherein at least one of the modeled mold cavities is a user-created modeled mold cavity.

9. A system comprising:
a user interface device;
a non-transitory machine-readable device including a program product; and
one or more processors operable to execute the program product, interact with the display device, and perform operations comprising:
simulating injection of each of a plurality of thermoplastic materials in each of a plurality of modeled mold cavities, each of the modeled mold cavities having different geometric dimensions;
determining respective values of a first expected energy parameter for each of the plurality of thermoplastic materials, the respective values of the first expected energy parameter for each of the plurality of thermoplastic materials being based on the simulated injection of the thermoplastic material in the plurality of modeled mold cavities;
determining respective values of one or more additional expected energy parameters for each of the plurality of thermoplastic materials, each value of an additional expected energy parameter for each of the plurality of thermoplastic materials being based on the simulated injection of the thermoplastic material in the plurality of modeled mold cavities;
determining, for each of the plurality of thermoplastic materials, a respective energy indicator value based at least on the respective values of the first expected energy parameter for the thermoplastic material and the respective values of the additional expected energy parameters for the thermoplastic material, the energy indicator value representing expected energy requirements for performing an injection of the thermoplastic material in a mold cavity; and
presenting the respective energy indicator value of one or more of the plurality of thermoplastic materials.

10. The system of claim 9, wherein each of the dimensions of the modeled mold cavities are adapted to simulate a distinct flow condition of thermoplastic material.

11. The system of claim 10, wherein:
the plurality of modeled mold cavities comprises a first cylindrical disk cavity having top and bottom circular end surfaces and a central injection gate located at the top circular end surface,
the plurality of modeled mold cavities further comprises a first rectangular plate cavity having four lateral end surfaces and a lateral gate located at one of the four lateral end surfaces,
the simulated injection of thermoplastic material into the first cylindrical disk cavity simulates injection of each of the plurality of thermoplastic materials into the first mold cavity through the central injection gate, and
the simulated injection of thermoplastic material into the first rectangular plate cavity simulates injection of each of the plurality of thermoplastic materials into the first rectangular plate cavity through the lateral injection gate.

12. The system of claim 11, wherein the plurality of modeled mold cavities further comprises:
- a second cylindrical disk cavity having top and bottom circular end surfaces and a central injection gate located at the top circular end surface;
- a second rectangular plate cavity having four lateral end surfaces and a lateral gate located at one of the four lateral end surfaces; and
- wherein a volume of the first cylindrical disk cavity is greater than a volume of the second cylindrical disk cavity and a volume of the first rectangular plate cavity is greater than a volume of the second rectangular plate cavity.

13. The system of claim 9, wherein the first expected energy parameter is related to the cooling time of a thermoplastic material and one or more of the additional expected energy parameters are related to the injection pressure to be applied to a thermoplastic material.

14. The system of claim 9, wherein the energy indicator value is based at least in part on a comparison of the value of the first expected energy parameter for the thermoplastic material with the values of the first expected energy parameter for one or more other thermoplastic materials in the plurality.

15. The system of claim 9, wherein determination of the energy indicator value for each of the plurality of thermoplastic materials is also based on one or more of a lifecycle characteristic of the thermoplastic material and an environmental impact characteristic of the thermoplastic material.

16. The system of claim 9, wherein at least one of the modeled mold cavities is a user-created modeled mold cavity.

17. A computer program product, encoded on a non-transitory computer-readable medium, operable to cause data processing apparatus to perform operations comprising:
- simulating injection of each of a plurality of thermoplastic materials in each of a plurality of modeled mold cavities, each of the modeled mold cavities having different geometric dimensions;
- determining respective values of a first expected energy parameter for each of the plurality of thermoplastic materials, the respective values of the first expected energy parameter for each of the plurality of thermoplastic materials being based on the simulated injection of the thermoplastic material in the plurality of modeled mold cavities;
- determining respective values of one or more additional expected energy parameters for each of the plurality of thermoplastic materials, each value of an additional expected energy parameter for each of the plurality of thermoplastic materials being based on the simulated injection of the thermoplastic material in the plurality of modeled mold cavities;
- determining, for each of the plurality of thermoplastic materials, a respective energy indicator value based at least on the respective values of the first expected energy parameter for the thermoplastic material and the respective values of the additional expected energy parameters for the thermoplastic material, the energy indicator value representing expected energy requirements for performing an injection of the thermoplastic material in a mold cavity; and
- presenting the respective energy indicator value of one or more of the plurality of thermoplastic materials.

18. The computer program product of claim 17, wherein the energy indicator value is based at least in part on a comparison of the value of the first expected energy parameter for the thermoplastic material with the values of the first expected energy parameter for one or more other thermoplastic materials in the plurality.

* * * * *